US006438798B1

(12) United States Patent
Chene et al.

(10) Patent No.: US 6,438,798 B1
(45) Date of Patent: Aug. 27, 2002

(54) EXTRA-FLAT EXPANDABLE HINGE

(76) Inventors: Richard Chene, 137, boulevard Koenig, F-92200 Neuilly-sur-Seine (FR); Dominique Delamour, 44, rue de la Milliere, F-78490 Les Mesnuls (FR); Olivier Rodi, 2, rue de l'Eglise, F-78650 Saulx-Marchais (FR)

( * ) Notice: Subject to any disclaimer, the term of this patent is extended or adjusted under 35 U.S.C. 154(b) by 0 days.

(21) Appl. No.: 09/402,117

(22) PCT Filed: Apr. 1, 1998

(86) PCT No.: PCT/FR98/00656
§ 371 (c)(1),
(2), (4) Date: Sep. 30, 1999

(87) PCT Pub. No.: WO98/44379
PCT Pub. Date: Oct. 8, 1998

(30) Foreign Application Priority Data

Apr. 2, 1997 (FR) .............................. 97 03982

(51) Int. Cl.⁷ ................................ E05D 11/10
(52) U.S. Cl. ............................ 16/335; 16/342; 16/284
(58) Field of Search .................. 16/335, 284, 286, 16/292, 297, 321, 342; 351/113, 158, 153

(56) References Cited

U.S. PATENT DOCUMENTS 3,744,886 A * 7/1973 Filitz .......................... 351/113
3,923,384 A * 12/1975 Leblanc ....................... 351/113
4,114,236 A * 9/1978 Vandrvort ..................... 16/142
4,256,388 A * 3/1981 Beyer .......................... 351/158
4,477,199 A * 10/1984 Manzoni ....................... 403/93
4,605,293 A * 8/1986 Blumenthal .................. 351/153
4,654,930 A * 4/1987 Lautenschlager ............. 16/288
5,146,649 A * 9/1992 Da Pra' ....................... 16/228

FOREIGN PATENT DOCUMENTS

| DE | 18 07 186 | 6/1969 |
| EP | 0 115 826 | 8/1984 |
| FR | 2 542 099 | 9/1984 |
| FR | 2 703 477 | 10/1994 |
| JP | 11-326843 | * 11/1999 |

* cited by examiner

Primary Examiner—Anthony Knight
Assistant Examiner—Mark Williams
(74) Attorney, Agent, or Firm—Young & Thompson

(57) ABSTRACT

A hinge includes a first rigid element enclosing elastic elements that have at least one elastic end oriented so that the elastic elements extend into a plane perpendicular to the axis of rotation of the hinge. One end of the first rigid element is formed by a knuckle-piece, which is inserted between a pair of knuckles that together constitute the rigid second element. A pin passes through all the knuckles. A bush, disposed between a female hinge of the second rigid element and the pin, defines a peripheral surface which serves as a cam surface, against which at least one portion of the elastic elements is adjusted.

20 Claims, 7 Drawing Sheets

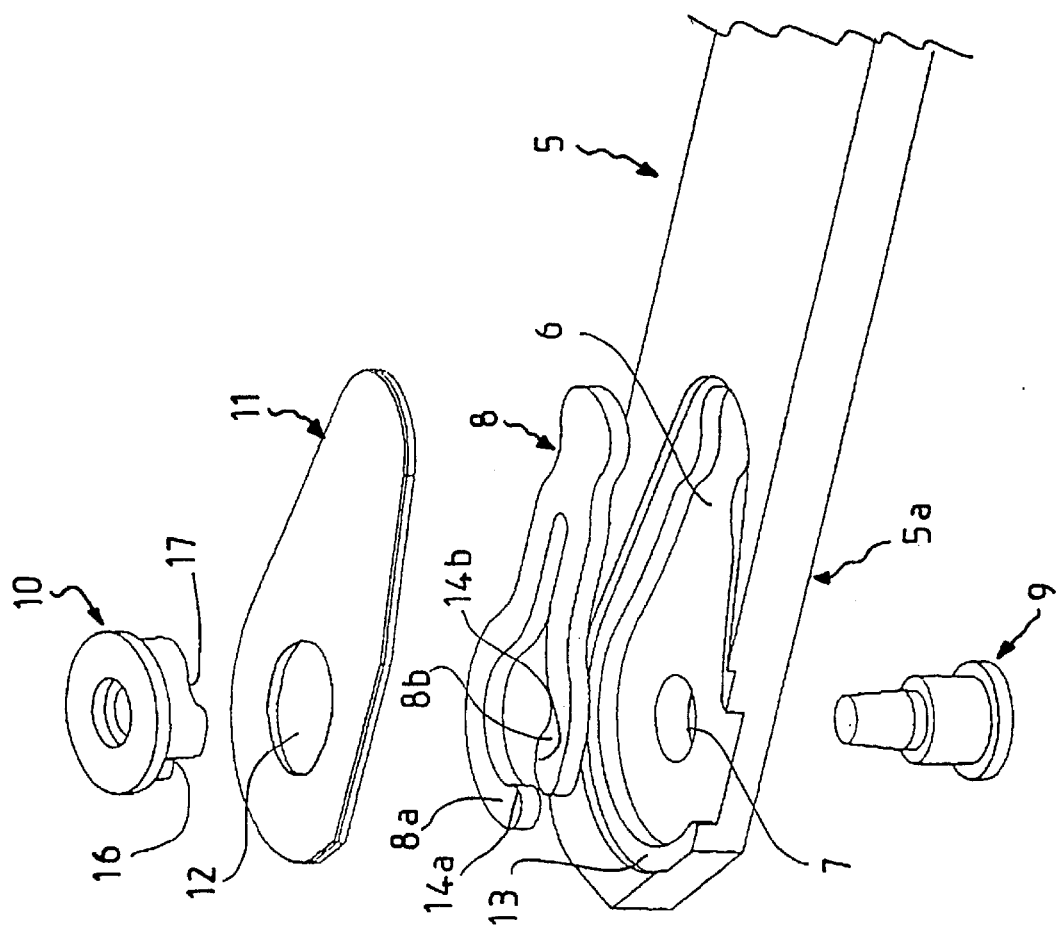
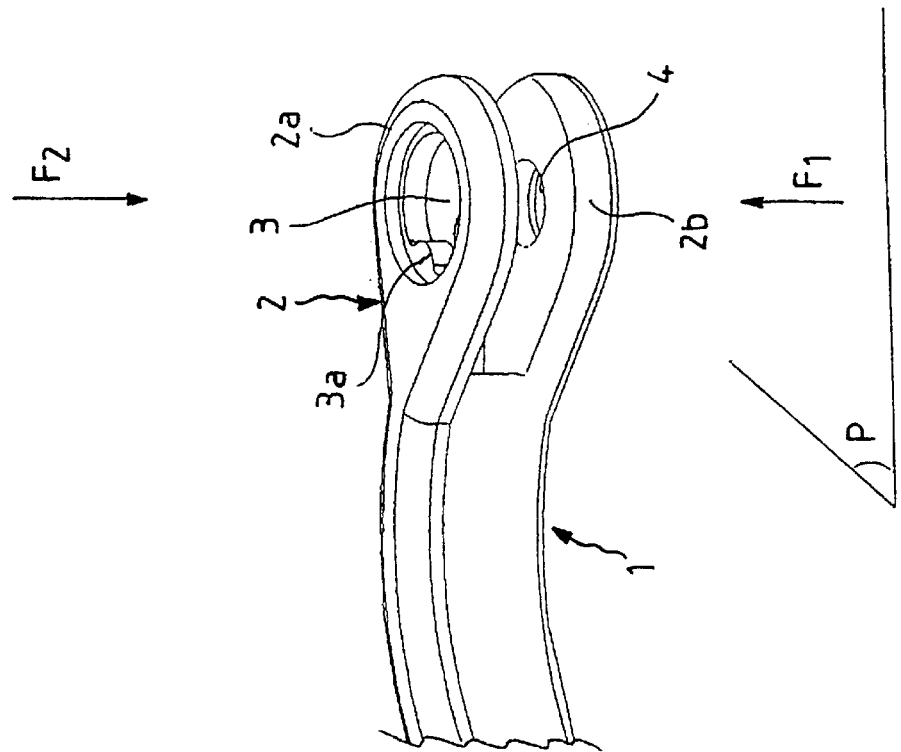
FIG 1

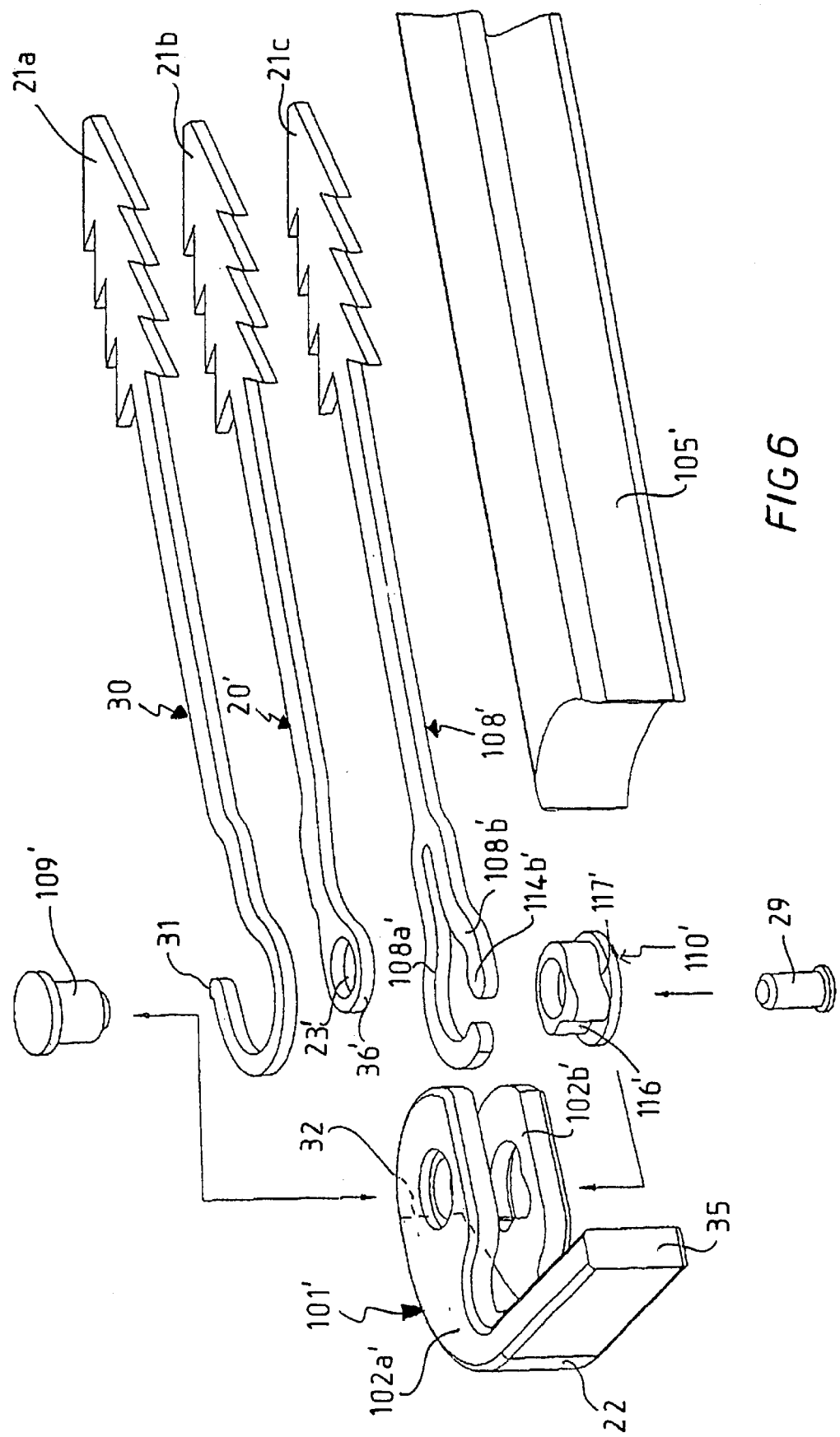

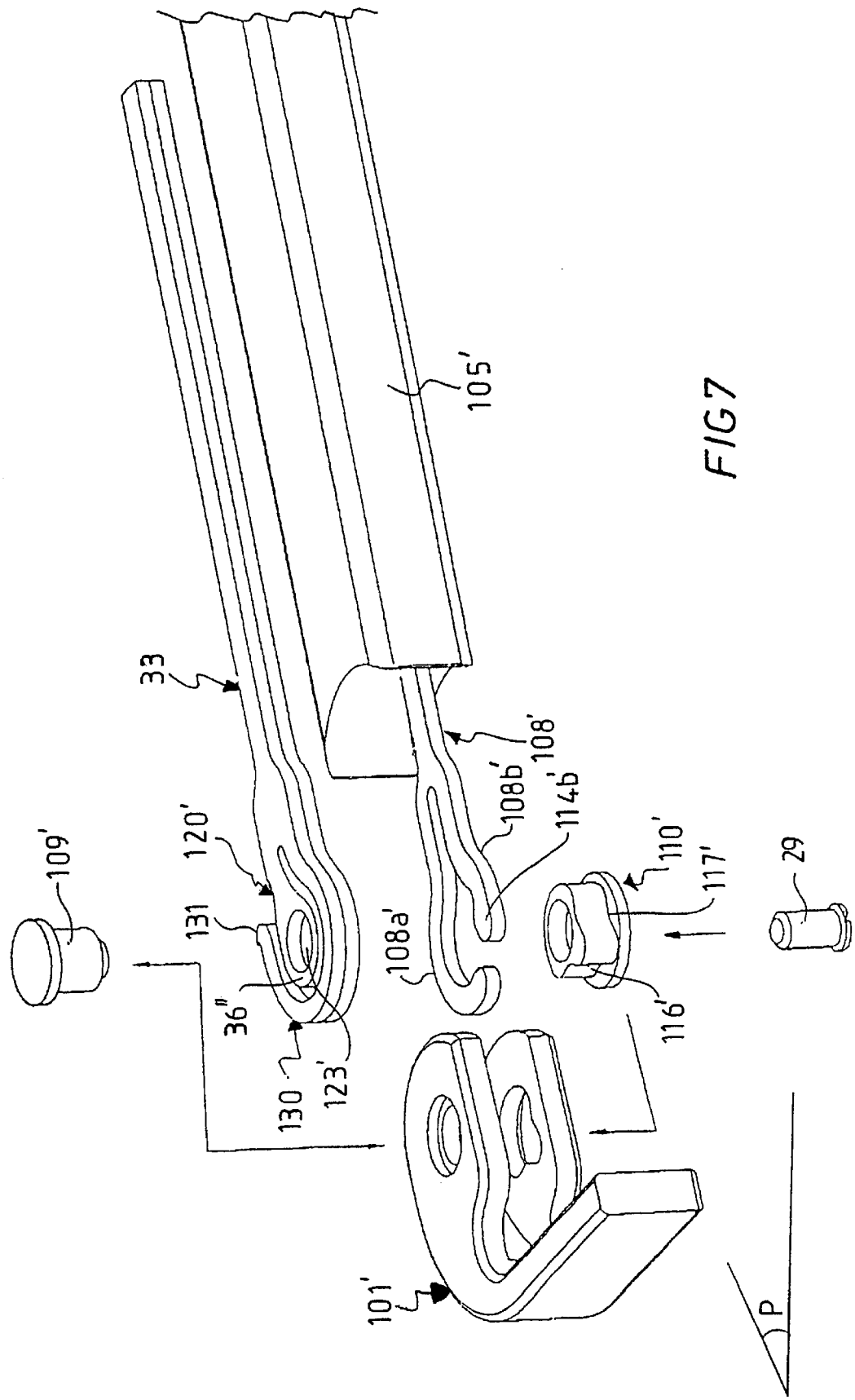

EXTRA-FLAT EXPANDABLE HINGE

BACKGROUND OF THE INVENTION

The present invention relates to an extendable hinge, and more particularly a hinge for spectacles.

Known extendable or spring hinges usually incorporate two rigid parts whose adjoining ends have a matching configuration and may include an external surface producing a cam action on the bearing faces, which parts are hinged to each other about a point of pivoting and connected to each other by a helical compression spring whose function is to return the rigid parts towards each other and keep these parts in one or more stable positions. When fitted to, say, a spectacle frame, hinges of the abovementioned type sometimes allow extended opening of the sidepieces beyond the stable open position (in which the sidepieces form an angle of approximately 93° with the front face of the frame) in such a way as to facilitate the placing of the frame on the wearer's face.

In recent years much research on hinges of this type has been targeted at reducing their size as far as possible, particularly in terms of their height, in order to enable them to be built into the increasingly lightweight frames now found on the market. This research has led to the springs being miniaturized, which, although giving satisfactory results, has by now reached a limit, the reduction in the size of the turns being limited by the diameter of the spindle around which they must sit.

Recent developments in spring hinges have therefore led to helical springs being replaced by a leaf of an elastic material such as polyurethane, or by a leaf spring. Progress in terms of size has however been insignificant because the reduction in size of these hinges is necessarily accompanied by a decrease in the height of the bearing faces of the rigid parts, thus resulting in enormous wear which makes it impossible to guarantee reliable operation of the hinge.

For example, patent application EP-A-0,115,826 discloses a spring hinge for a spectacle sidepiece in which the sidepiece is connected to a socket that pivots, about a screw, on a head forming a cam which is itself integral with the front face of the frame. The socket contains a leaf spring consisting of a stack of three diamond-shaped leaves held in place by fixing one of its ends in the socket while its other end is intended to press against either of two perpendicular surfaces of the said cam in order to define two stable positions, namely open and closed, of the sidepiece. The hinge disclosed also allows slightly extended opening of the sidepiece which is limited by stop means. A device working on the same principle is disclosed in EP-A-0,235,780. This device additionally incorporates a screw for adjusting the initial tension of the spring, which in this patent application has a circular cross section with frustoconical ends.

In these two known devices, the cam head has such small bearing surfaces that the device cannot, without deformation, take stresses very slightly greater than those which it undergoes normally in the course of use, particularly stresses applied at right angles to the normal plane of articulation of the hinge, unless the height of the cam part is increased—the very opposite of what is intended. Also, these devices require adjustment screws and/or fastening screws. Consequently the known spring hinges which use leaf springs are unsuited to the stresses currently imposed in the spectacles market both by manufacturers, as regards the minimum load the frames must be able to withstand without deforming, and by users concerned about the aesthetic appearance of the frames.

French Patent No. 1,593,112 in the name of Mari discloses a click-action hinge for a spectacle frame that comprises a square-section spindle about which can pivot a sharp-edged seat mounted in a spectacle sidepiece. The sidepiece has two stable positions. In addition, the seat has a longitudinal slot which gives it a certain elasticity and allows elastic return of the sidepiece to the normal open position after it has been opened slightly past the perpendicular to the face.

The known hinge does not have the disadvantages of the devices mentioned earlier. However, it requires, by its very design, a gap between the sidepiece and the front face of the frame, and dirt can settle in this gap. The gap is also aesthetically unattractive, as is the visible seat. In addition, a slight tug on the sidepiece in the direction of the wearer's ear is sufficient to pull the hinge apart. Lastly, the elastic return to the open position has to overcome friction forces—which themselves cause hinge wear—exerted by the seat on the square-section spindle and, because of the configuration of the spindle, this action can, beyond a certain angle of pivoting of the sidepiece, take the sidepiece as far as a position lying in the continuation of the face of the frame.

SUMMARY OF THE INVENTION

The Object of the invention is therefore to overcome the disadvantages of the prior art.

More specifically, it is an object of the invention to provide a novel extendable hinge that is extremely small, particularly in terms of height, but nonetheless does not impair the ability of the said hinge to withstand breakage, particularly during the application of stresses perpendicular to its normal plane of articulation or under the action of a tensile force acting along the sidepiece.

Another object of the invention is to provide an extendable hinge that has no visible screws or connecting and/or return parts.

Another object of the invention is to provide an extendable hinge whose manufacturing costs are less than those of hinges of the prior art.

These objects are achieved by the present invention in that it provides a hinge comprising, in a manner known per se, a first rigid part mounted so as to pivot about a pin on a second rigid part, which first part contains spring means that consist of at least one leaf spring and are such as to engage with a part having a cam surface fixed to the said second part, or made in one piece with it, in order to define stable relative angular positions of the said rigid parts.

The hinge according to the invention differs from the known hinges, however, in that one end of the said first rigid part is connected to, or consists of, a portion forming a knuckle which is inserted between a pair of knuckles that form the end of the said second rigid part, with the said pin being inserted through all these knuckles, while a bush is interposed between one knuckle of the said second rigid part and the said pin, which bush defines both a cylindrical passage in which to accommodate the said pin and an external peripheral surface constituting the said cam surface and against which at least a portion, termed the "clamping portion", of the said spring means is designed to fit.

The clamping portion of the spring means may be, for example, in the general shape of a Y or in the general shape of a flat hook. Furthermore, the spring means may be composed of a single leaf spring or several leaf springs that are superimposed and/or arranged side by side and oriented in such a way that their smallest dimension, in cross section, extends in a plane perpendicular to the normal plane of articulation of the two rigid parts. In order to reduce the size of the hinge to a minimum, the smallest dimension of the spring means will be, for example, approximately 0.4 mm, so as to give a hinge having a total height of no more than approximately 2 mm.

The stable relative angular positions of the rigid parts will preferably be obtained by engagement of at least one recess provided on the said cam surface with at least one matching protuberance provided on one end of the said clamping portion of the spring means. The number of protuberances and matching recesses, by which one rigid part is held in a stable position relative to the other, is not restrictive and will depend on the intended use of the hinge according to the invention. As a variant and/or in addition, the holding of the sidepiece in the open and closed positions could be produced instead by the bush being "squeezed" by the clamping portion of the spring means. If so, the recesses and protuberances would not necessarily match each other exactly.

In a first embodiment of the invention, the knuckle portion is formed by one end of the said first rigid part, in which case the spring means are preferably in the general shape of a Y whose two arms form the said clamping portion of the said spring means. Advantageously, the spring means also include a return part composed of a third arm, made in one piece with the said two arms and adjacent to these in the said normal plane of articulation, which third arm is such as to abut elastically against the said second rigid part.

In a second embodiment of the invention, the said knuckle portion of the first rigid part is formed by another portion, termed the "encircling portion", of the spring means.

In this case the spring means advantageously also include a return part shaped like a flat hook having an outwardly curved tip that is such as to abut elastically against the said second rigid part. The return part may be a separate part which is placed on top of the said encircling portion of the said spring means. As a variant, it may be formed by a portion surrounding the encircling portion of the spring means, in the normal plane of articulation.

It will be understood that the special structure of the hinge according to the invention, particularly the engagement of the knuckles and the close fit of the clamping portion of the spring means around the bush, gives the hinge good resistance to the stresses which may be applied to it in several planes. It is obvious too that, because of the elimination of the bearing faces on the external surface of the second rigid part, the latter may advantageously be made from a commonly used material, such as nickel-silver or titanium, whereas more expensive materials capable of withstanding a large shearing force, such as treated steel, may be reserved for the bush described earlier.

The invention also relates to applications of the hinge described above. The hinge finds its most useful application as a spectacle frame hinge, in which one of the rigid parts is mounted on, or consists of, a spectacle sidepiece and the other part is a rigid component integral with the front face of the said spectacle frame, often known as a "corner piece". The hinge according to the invention may be used, in a variant, in the hinging of a door, such as a refrigerator door or a vehicle door, with respect to a door frame. However, these applications are not of course restrictive, and other types of articulation familiar to those skilled in the art can be fitted with the abovementioned hinge.

BRIEF DESCRIPTION OF THE DRAWINGS

The invention will now be described in more detail with reference to the following description, taken in combination with the appended drawings in which:

FIG. 1 is a schematic view from beneath, in exploded perspective, of a hinge in a first embodiment of the invention;

FIG. 6 is an exploded schematic view, seen in perspective from above, of a hinge in a variant of the embodiment in FIG. 5;

FIG. 7 is an exploded schematic view, seen in perspective from above, of a hinge in another variant of the embodiment seen in FIG. 5.

DETAILED DESCRIPTION OF THE PREFERRED EMBODIMENTS

Figure 2:
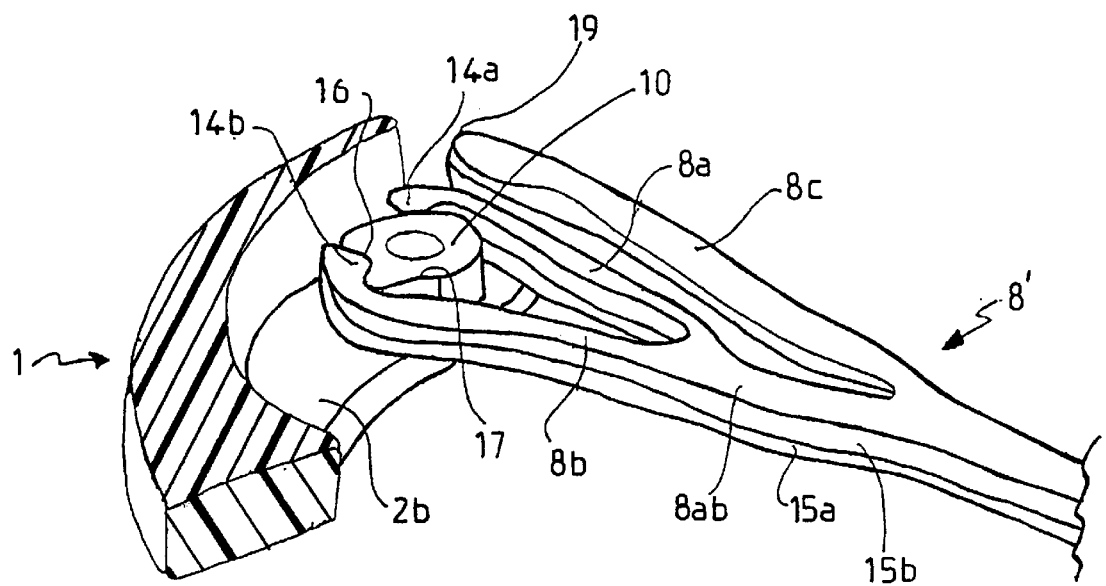
FIGS. 2 to 4 are schematic views from beneath, in partial section, of parts of a hinge in a variant of the first embodiment of the invention, applied to a spectacle frame, and illustrating the closed, open and extended open positions, respectively, of the sidepieces of the spectacles.

In this description the term "height" refers to a dimension measured in the direction of the height of the sidepieces of the spectacles, considered in their normal use by a wearer. Also the expression "angle of extended opening" refers to the difference between the obtuse angle formed by the sidepiece with the front face of the spectacle frame in the maximum stretched open position and the angle (about 93°) formed by the sidepiece with the front face of the frame in the normal open position.

Referring initially to FIG. 1, this shows a hinge according to the invention fitted to a spectacle frame comprising, in a manner known per se, rigid part 1, generally termed the corner piece, which is designed to be fixed to the front face of the frame by a first end (not shown). The corner piece 1 may be screwed and/or joined by some fusion-based process to the front face of the frame, optionally after first being bent to adjust its curvature to that of the front face. In the embodiment illustrated, the end 2 of the corner piece 1 remote from its first end possesses two flat lobes 2a, 2b situated in planes parallel to each other and to the normal plane of articulation P of the hinge. An approximately circular through hole 3, whose periphery defines two projections such as 3a, is formed in lobe 2a, while a circular through hole 4 of smaller diameter is formed in lobe 2b. The lobes 2a and 2b form the knuckles of the rigid part 1.

The other rigid part of the hinge consists of one of the sidepieces 5 of the spectacles. As seen in FIG. 1, the end 5a of the sidepiece 5 has a through hole 7 of the same diameter as the hole 4, so that the said end 5a forms the knuckle of the sidepiece 5. More specifically, the hole 7 is made in the bottom of a recess 6 in the shape of a curvilinear isosceles triangle formed in the thickness of the sidepiece 5.

The knuckle 5a of the sidepiece 5 fits between the two knuckles 2a and 2b of the corner piece 1, the corner piece 1 and the sidepiece 5 being hinged to each other about a crimped pin 9 which is inserted in the direction of the arrow F1 through the aligned holes 4 and 7 and fits into a bush 10 which is inserted in the direction of the arrow F2 through the through hole 3.

Movement of the bush 10 perpendicularly to the plane P is prevented by engagement of the pin 9 with the bush 10. Specifically, the pin 9 is pushed in and then crimped or adhesively bonded or fixed in some other way inside the bush 10. Clearly, however, some form of locking part could, as a variant, be inserted into the pin 9, as illustrated for example at 29 in FIG. 5. Either way, the person skilled in the art will note that the resulting assembly can easily be taken apart with a hammer and a pin drift, e.g. in order to replace a damaged sidepiece.

Rotary movement of the bush 10 in the plane P is prevented by the engagement of the two projections, such as 3a, with two recesses 16 and 17 formed in the periphery of the bush 10. The number of paired recesses and projections is however not a limitation. Another function of the recesses 16 and 17 will be seen below. It will be realized that the pin 9 and locking part 29 turn freely as an assembly in the bush 10.

Still referring to FIG. 1, it can be seen that the hinge according to the invention also comprises spring means 8 which in this embodiment form an approximate Y shape, the arms 8a and 8b of the Y having an approximately rectangular cross section and having respective protuberances 14a and 14b towards their free end. The spring means 8 are designed to sit in the recess 6 whose periphery is of a similar shape, but with slightly greater dimensions than those of the said spring means.

The hinge illustrated also includes a protective cap 11 in the form of a plate designed to cover the spring means 8 completely and containing an opening 12 of larger dimensions than the periphery of the bush 10. The cap 11 is designed to fit on top of the spring means 8, on a shoulder 13 formed in the recess 6 so as to conceal the spring means 8 from sight and protect it from dust.

It will be appreciated that, in view of the very flat configuration of the spring means 8, whose height may be of the order of 0.4 mm, the sidepiece 5, and hence also the corner piece 1, can also be of minimal height. It will be appreciated too that the fitting together of the knuckle 5a and the knuckles 2a and 2b with the pin 9 ensures that the hinge cannot come apart if subjected to unusual stresses.

Figure 3:
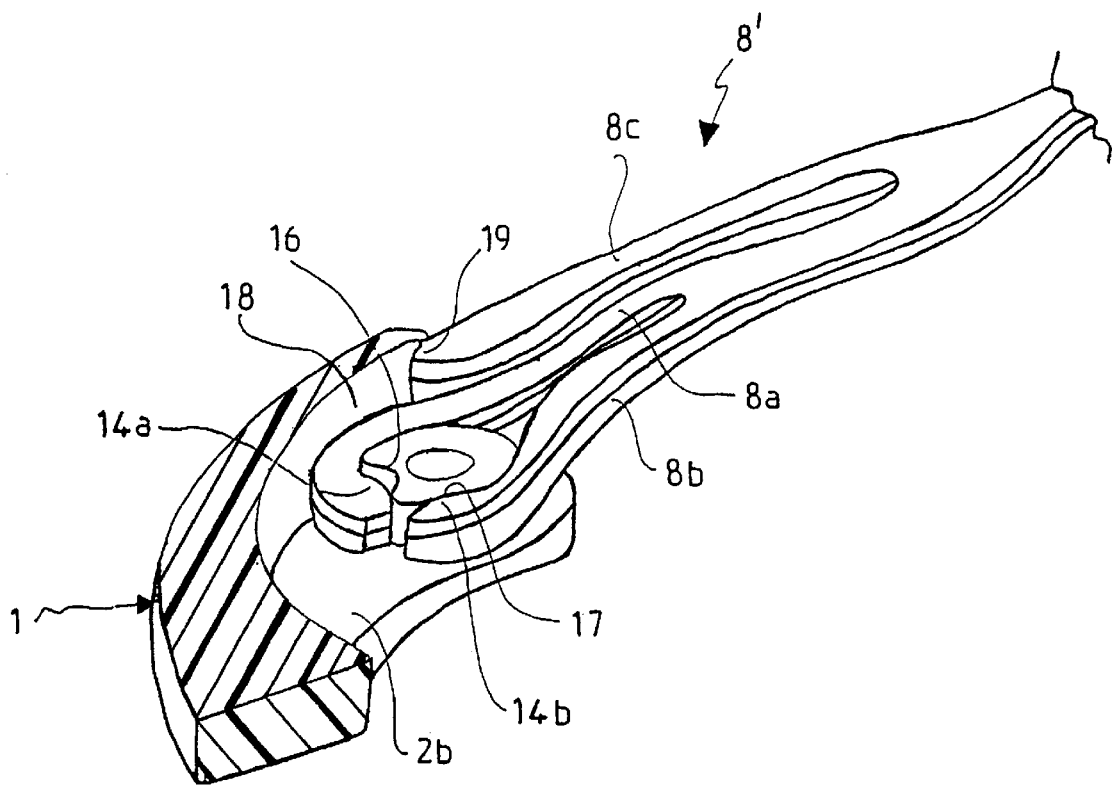
Figure 4:
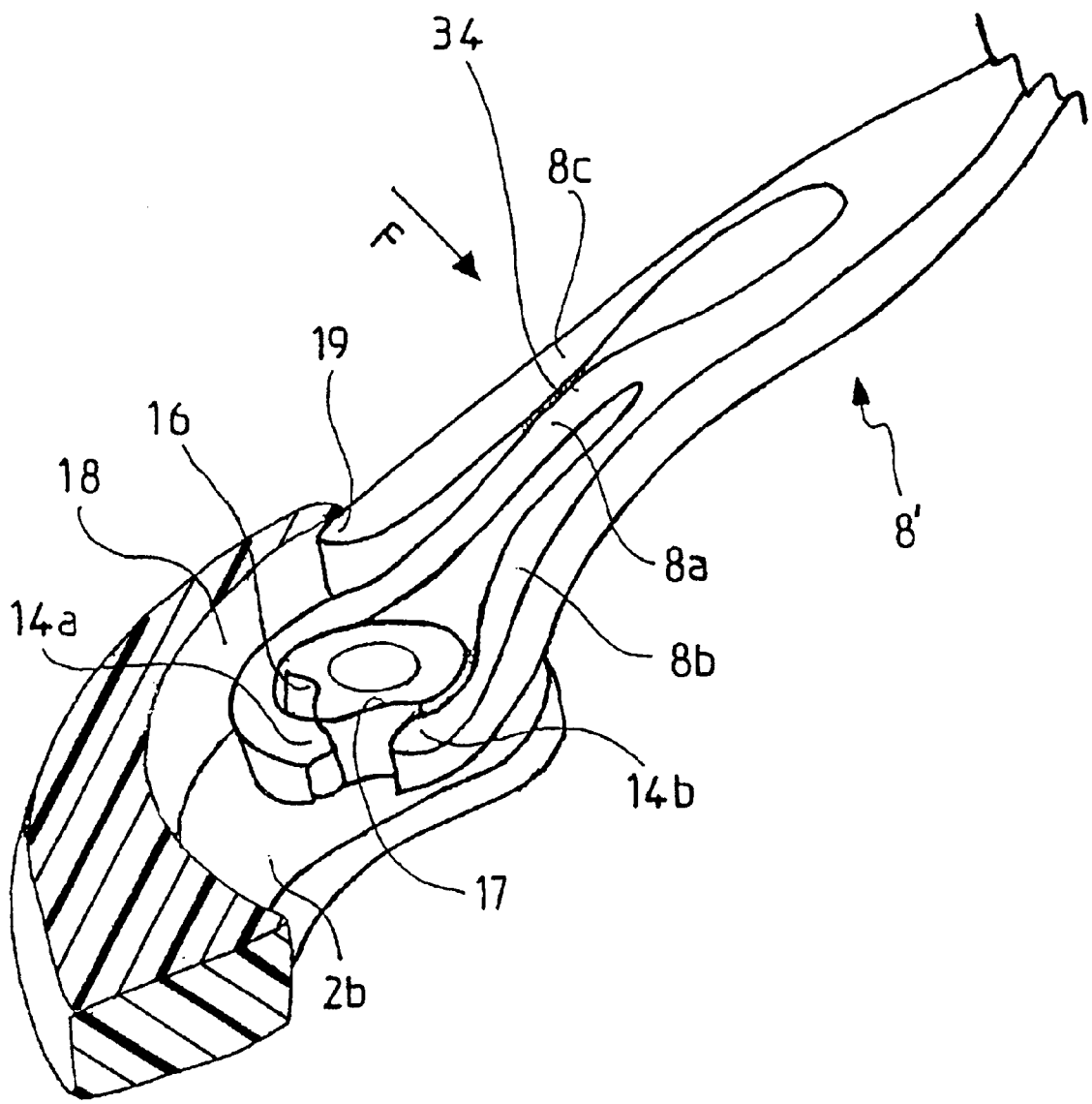

FIGS. 2 to 4 illustrate a variant of the hinge shown in FIG. 1. In these figures, structural parts identical to parts shown in FIG. 1 will be given the same reference numbers. Similar parts will be denoted by the same reference numbers followed by the prime sign.

As FIG. 2 shows, this embodiment differs from that described with reference to FIG. 1 essentially in that the spring means 8' include an extra portion 8c which is made in one piece with the common end 8ab of portions 8a and 8b. The parts of this hinge which are not shown, such as the sidepiece, the second knuckle of the corner piece, and the pin, are the same as illustrated in FIG. 1. It will be understood therefore that, in reality, portions 8a and 8b of the spring means are not placed against the hinge 2a as depicted, but that the knuckle 5a is interposed between these parts.

The portions 8a and 8b are adjusted tightly around the bush 10, possibly with an initial stress if it is wished to reduce to a minimum the play between the corner piece 1 and the sidepiece (which is not shown). As can be seen in these figures, another difference between this and the variant illustrated in FIG. 1 is that the spring means 8' are formed by two stacked leaf springs, such as 15a, 15b, although this number is not restrictive. Actually, the number of stacked leaf springs will depend on how much resistance to stress it is wished to give the frame.

In FIG. 2 the hinge according to the invention is fitted to a spectacle frame in which the sidepieces are in the closed or folded position. In this position the protuberance 14b extending from the free end of the portion 8b engages in the recess 16 defined in the periphery of the bush 10 so as to keep the sidepiece still, while the protuberance 14a on portion 8a is simply resting against the outer periphery of the bush 10. It will be observed also that portion 8c of the spring means 8' is under no stress.

FIG. 3 shows the same parts as before, but with the sidepiece in the normal open position, that is to say a position in which the sidepiece of the spectacles (not shown) forms an angle of about 93° with the front face of the frame (not shown). The stability of this position of the sidepiece is ensured here by the respective engagement of protuberances 14a and 14b, on portions 8a and 8b respectively, in the recesses 16 and 17, while the free end 19 of portion 8c of the spring means 8' has come into contact with the inner wall 18 of the corner piece 1, although this portion 8c is under no bending force.

At this stage the operation of this hinge is no different than that of the hinge shown in FIG. 1.

FIG. 4 illustrates a subsequent stage in the opening of the sidepiece, corresponding to a so-called extended open position, in which the sidepiece can form an angle of as much as 120° with the front face of the frame. In this extended open position, the protuberances 14a, 14b and the recesses 16, 17 are no longer in mutual engagement. In addition, since the end 19 of portion 8c of the spring means 8' is still in contact with the wall 18, because of the continued rotation of the sidepiece relative to the position illustrated in FIG. 3, portion 8c now comes under a bending force in the direction of the arrow F which presses it at 34 against portion 8b. It will be seen therefore that the size of the angle of the extended opening will depend on the flexibility of the spring means 8'. It is obvious too that the configuration shown in FIG. 4 corresponds to an unstable position of the spectacle sidepiece, which will have a tendency to spring back, under the return force exerted by the spring means 8', to a position shown in FIG. 3.

Figure 5:
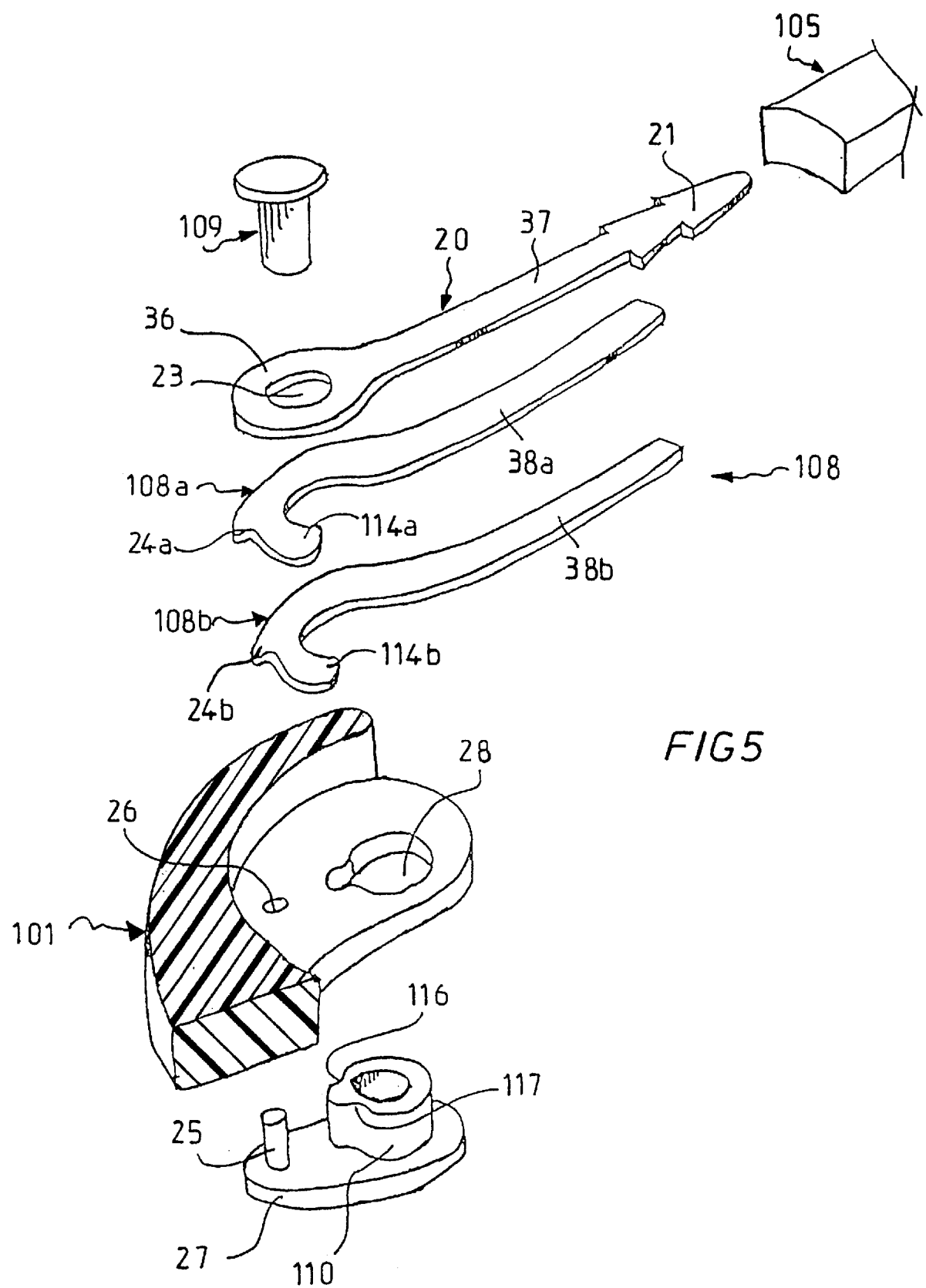
FIG. 5 is an exploded schematic view, seen in perspective from above and in partial section, of a hinge in a second embodiment of the invention.

Turning now to FIG. 5, this shows a hinge in a second embodiment of the invention, prior to assembly. Identical reference numbers increased by the value 100 will be given to parts similar to those described with reference to FIGS. 1 to 4.

The hinge shown in FIG. 5 thus comprises a corner piece 101 and a spectacle sidepiece 105. These are designed to be hinged to each other about a pin 109 which fits into a bush 110. In this embodiment the knuckle 36 of the sidepiece 105 is formed in one end of a connecting spring part 20 which is in the general form of a thin leaf spring. The other end 21 of the connecting part 20 is barbed so that it can be inserted into and blocked inside the sidepiece 105. The end 21 of the connecting part 20 and the sidepiece 105 can therefore be overmoulded, that is, the part 20 is positioned inside the mould in which the sidepiece is made before the plastic material is injected into the mould to produce the sidepiece. Alternatively the part 20 can be pushed into the sidepiece 105 while the material of the sidepiece is raised to a temperature above its softening point. The hinge also possesses, as its spring means 108, two leaf springs 108a and 108b, which are each roughly the shape of a thin, flat hook whose curved end terminates with a protuberance 114a and 114b, respectively, turned towards the inside of the hook, and includes a projection 24a and 24b, respectively, on the outside curve of the hook. The connecting part 20 and the leaf springs 108a, 108b are stacked so that the opening 23 of the connecting part 20 is lined up with the area inscribed inside the hooked curved end of the leaf springs 108a, 108b and also so that the respective bodies 37, 38a and 38b of the said part and of the said leaf springs are superimposed on each other. In the variant illustrated, the hooks of the leaf springs 108a and 108b face in the same direction; however, they could face in opposite directions. The connecting part 20 and the leaf springs 108a and 108b together form the spring means of the hinge.

In this embodiment, the bush 110 is integral with a supporting plate 27 on which there also stands a cylindrical dowel 25. The knuckle part of the corner piece 101 contains an opening 28 matching the shape of the bush and a through hole 26 of a diameter slightly greater than that of the dowel 25, so that the bush 110 and the dowel 25 fit into the opening 28 and the hole 26, respectively.

When the sidepiece of the spectacles is in the open position, the protuberances 24a and 24b abut against the dowel 25 which forms a stop. In this position the protuberances 114a and 114b are sitting in the recess 117 formed in the periphery of the bush 110. The stable closed, or folded, position of the sidepiece is arrived at by engaging the same protuberances 114a and 114b in the recess 116 formed in the periphery of the bush 110. In this second embodiment of the invention the connecting part 20 and the leaf springs 108a and 108b preferably have more or less identical characteristics of elasticity which, as will be seen from FIG. 5, will determine the maximum amplitude of the extended open angle of the spectacle sidepiece, which can be as much as 90°.

Mechanical tests carried out on a spectacle frame fitted with the hinge described with reference to FIG. 5 have shown that the frame fulfils the strength requirements imposed by manufacturers of spectacles for children, in the sense that they withstood, without breaking, the application of a 4.535 kg load on each sidepiece at a distance of 50.8 mm from the axis of rotation of the hinge so that the sidepiece was pivoted through 180° in the normal plane of articulation, relative to its folded position.

Two variants of the hinge illustrated in FIG. 5 are shown in FIGS. 6 and 7. In FIG. 6, parts similar to those described with reference to FIG. 5 will be given the same reference numerals followed by the prime sign. Some of these parts will therefore not be described again.

The variant seen in FIG. 6 differs from that of FIG. 5 essentially in that in the first place a single leaf spring 108' replaces the leaf springs 108a and 108b, and in the second place it incorporates a separate return part.

More precisely, the spring means shown in FIG. 6 include a return leaf spring 30 on top of both a connecting piece 20' and a leaf spring 108' and all three of these have a barbed end 21a–c similar to the end 21 of the connecting part 20 shown in FIG. 5, by means of which ends they are held firmly in the sidepiece 105' of the spectacles.

At the opposite end from the end 21c of the leaf spring 108' is a Y-shaped free end comprising two arms 108a' and 108b', in a similar way to the spring means 8 of FIG. 1. Parts 108a' and 108b' of the leaf spring 108' are designed to fit around the periphery of a bush 110' and engage in the recesses 116' and 117', respectively, formed in the bush in the same way as will be described with reference to FIGS. 8A to 8C.

At the opposite end from the end 21a, the return leaf spring 30 is formed into a hook, the curved tip of which is bent out, as indicated at 31.

The knuckles 102a' and 102b' of the corner piece 101' are integral with a curved wall 22 of which one end 35 comes into alignment with the front face of the frame and of which the tapering other end 32 is approximately perpendicular to the end 35. With the sidepiece 105' in the stretched open or extended open position, the bent-out tip 31 of the return leaf spring 30 abuts against the wall 32 of the corner piece 101', in a similar way to that illustrated in FIG. 8B.

It will be observed that the embodiment illustrated includes a locking part 29 which engages with the opposing hollow end of the pin 109'. To be specific, in order to prevent any movement of the bush 110' perpendicular to the plane P, the part 29 is inserted and then crimped or adhesively bonded or fixed in some other way inside the pin 109'.

FIG. 7 illustrates a variant of the hinge shown in FIG. 6. In this figure, parts identical to those of FIG. 6 are identified by the same reference numbers and will not be described again, and parts that are similar will be identified by the same reference numbers increased by 100.

The hinge shown in FIG. 7 differs from that in FIG. 6 essentially by the fact that the connecting part 20' and the return leaf spring 30 of FIG. 6 are replaced by a single connecting and return leaf spring 33 which is designed to sit on top of the leaf spring 108' and is forced into a spectacle sidepiece 105'. The free end of the connecting and return leaf spring 33 comprises two distinct parts made in one piece, one forming the connecting part 120' and the other the return leaf spring 130. Much as in FIG. 6, the portion that forms the connecting part 120' contains a circular opening 123' while the portion that forms the return leaf spring 130 is in the shape of a hook whose curved tip 131 is bent out.

Figures 8A, 8B, 8C:
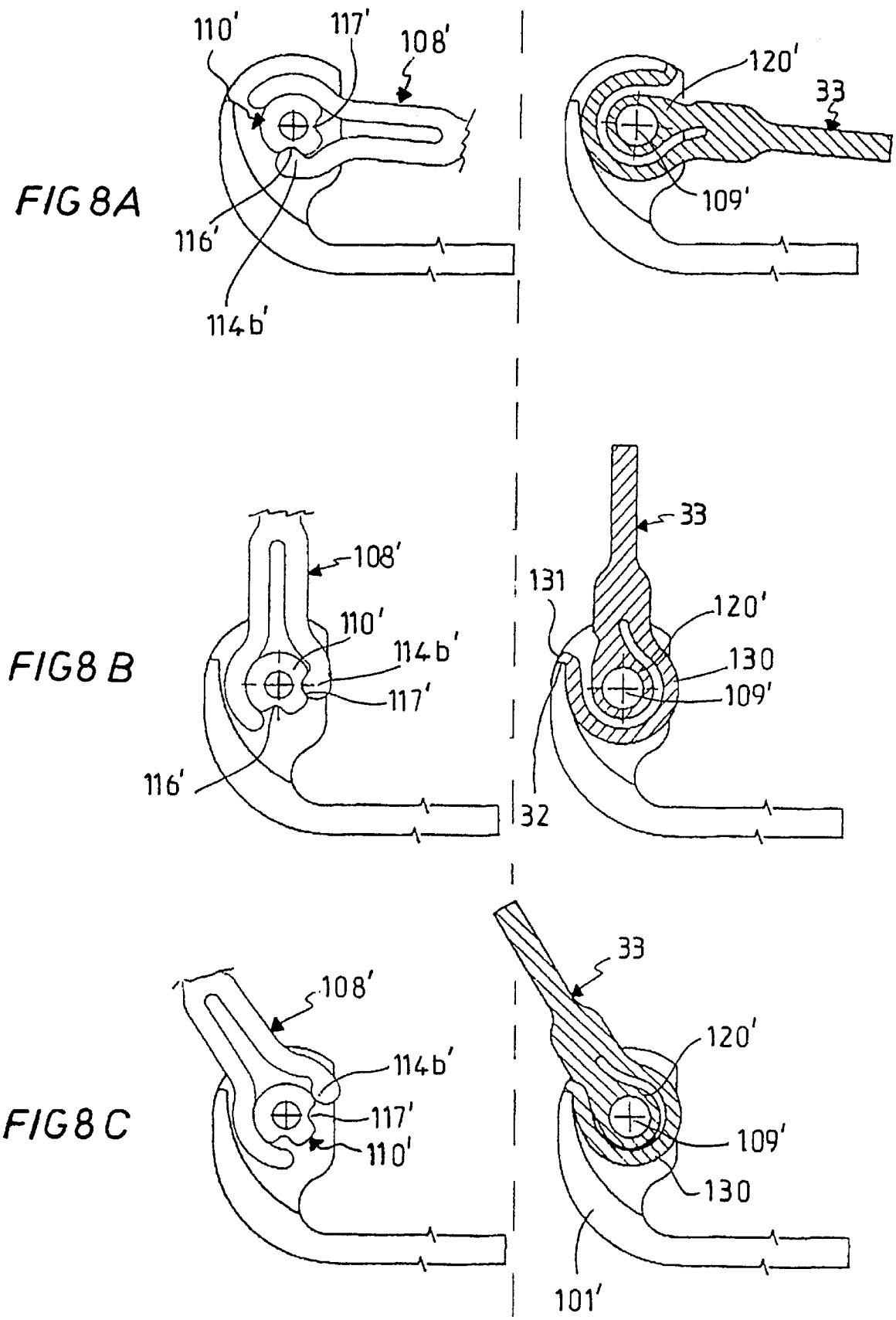
FIGS. 8A to 8C are schematic views, seen from above, illustrating the operation of the hinge shown in FIG. 7.

FIGS. 8A to 8C illustrate the operation of the hinge shown in FIG. 7. Down the left-hand side are views taken in a plane which is both parallel to the plane of articulation and intermediate between the leaf spring 108' and the connecting and return leaf spring 33, while in parallel, down the right-hand side, are views taken in a plane which is parallel to the plane of articulation and which contains the said connecting and return leaf spring 33 viewed in section.

FIG. 8A shows that in the closed position of the sidepiece (not shown) of the spectacles, the protuberance 114b' of the leaf spring 108' is received in the recess 116' formed in the periphery of the bush 110' and the connecting and return leaf spring 33 is not under any stress.

As the sidepiece is moved into the normal open position, the protuberance 114b' drops into the other recess 117' formed in the bush 110' and, at the same time, the portion forming the connecting part 120' of the connecting and return leaf spring 33 rotates about the pin 109' until the bent-out tip 131 of the portion forming the return leaf spring 130 of the connecting and return leaf spring 33 abuts against the end 32 of the corner piece, as illustrated in FIG. 8B.

It will be understood therefore that the positions shown in these figures correspond to stable positions of the sidepiece of the spectacles relative to the corner piece.

If the sidepiece opens further as far as the extended open position illustrated in FIG. 8C, the protuberance 114b' will come out of the recess 117', with the result that the ends of the leaf spring 108' will simply rest against the periphery of the bush 110': the position thus defined is unstable. Simultaneously, because the rotation of the portion forming the connecting part 120' about the pin 109' has been continued while the portion forming the return leaf spring 130 is in abutment against the corner piece 101', the two portions of the connecting and return leaf spring 33 have met and have been deformed to the limit of their elasticity. It will thus be understood that the position illustrated in FIG. 8C is a position of maximum stretched opening, corresponding to an angle of extended opening of about 45° or more, in which the connecting and return leaf spring 33 has a tendency to return to its undeformed condition as in FIG. 8B and thus has a tendency to exert a return action on the sidepiece of the spectacles.

The embodiment illustrated in FIGS. 5 to 7 has the advantage over that illustrated in FIGS. 1 to 4 that the sidepiece of the spectacles may be made of plastic because it does not define a passage for the pin, this function being provided by the connecting part.

Clearly, the above description is given purely by way of example, and various modifications could be made to it without departing from the scope of the invention. For example, the hinges illustrated in FIGS. 5 to 7 could, much as in FIGS. 2 to 4, include elastic parts that each consist of a stack of two leaf springs or more.

As is apparent from the above description, the spring hinge according to the invention, when fitted to a spectacle frame, is therefore extremely small, particularly in terms of its height, and yet exhibits good resistance to the stresses which may be applied to it in several planes. It will be seen too that, in all the embodiments of the invention, the special shaping of the spring means makes the use of fixing and adjusting screws superfluous. However, a screw could if wished be used in the place of the locking part 29 of FIGS. 6 and 7.

The above remarks are of course also valid for the other applications of the hinge according to the invention, in which the sidepiece and the corner piece described above are replaced by other portions of rigid parts that have to be hinged, such as a door and door frame.

What is claimed is:

1. A hinge comprising:
   a first rigid part including a first knuckle at one end;
   a second rigid part comprising a second and a third knuckle at a first end, said first knuckle being insertable between said second and third knuckles, said first rigid part being pivotably mounted about a pin that extends through said first, second and third knuckles;
   a leaf spring contained within said first rigid part, said leaf spring comprising a clamping portion for engaging a cam surface for defining stable relative angular positions of said first and second rigid parts; and
   a bush around said pin, said bush having a cylindrical passage accommodating said pin and an external peripheral surface forming said cam surface;
   said leaf spring expanding perpendicular to axes of rotation of said first and second rigid parts;
   said leaf spring being substantially in a shape of a Y having two arms that form said clamping portion.

2. The hinge according to claim 1, wherein said leaf spring has a thickness extending in a plane perpendicular to a plane of articulation of said first and second rigid parts, said thickness being approximately 0.4 mm.

3. A spectacle frame comprising the hinge according to claim 1, for a spectacle frame.

4. A door hinge comprising the hinge according to claim 1.

5. The hinge according to claim 1, wherein said bush is integral with said second rigid part.

6. The hinge according to claim 1, wherein said bush is an element separate from said second rigid part.

7. The hinge according to claim 1, further comprising a protuberance on a first end of said clamping portion, and wherein said cam surface comprises a recess for engaging said protuberance.

8. The hinge according to claim 1, wherein said first knuckle comprises an encircling portion.

9. The hinge according to claim 1, wherein said first knuckle comprises an encircling portion and said leaf spring comprises a return part, adjacent said one end of said first rigid part, shaped like a flat hook having an outward-bending open tip for elastically abutting against said second rigid part, said return part being mounted on said encircling portion.

10. The hinge according to claim 1, wherein said first knuckle comprises an encircling portion, and said one end of said first rigid part comprises an external portion shaped like a hook having an outwardly bending open tip for elastically abutting against said second rigid part, said external portion partially surrounding said encircling portion.

11. A hinge comprising:
    a first rigid part including a first knuckle at one end;
    a second rigid part comprising a second and a third knuckle at a first end, said first knuckle being insertable between said second and third knuckles, said first rigid part being pivotably mounted about a pin that extends through said first, second and third knuckles;
    a leaf spring contained within said first rigid part, said leaf spring comprising a clamping portion for engaging a cam surface for defining stable relative angular positions of said first and second rigid parts; and
    a bush around said pin, said bush having a cylindrical passage accommodating said pin and an external peripheral surface forming said cam surface;
    said leaf spring expanding perpendicular to axes of rotation of said first and second rigid parts;
    said clamping portion is substantially in a shape of a Y having two arms and wherein said leaf spring further comprises a third arm made in one piece with said two arms adjacent to said two arms, said third arm elastically abutting against said second rigid part.

12. The hinge according to claim 11, wherein said first knuckle comprises an encircling portion.

13. The hinge according to claim 11, wherein said leaf spring has a thickness extending in a plane perpendicular to a plane of articulation of said first and second rigid parts, said thickness being approximately 0.4 mm.

14. A door hinge comprising the hinge according to claim 11.

15. A hinge comprising:
    a first rigid part including a first knuckle at one end;
    a second rigid part comprising a second and a third knuckle at a first end, said first knuckle being insertable between said second and third knuckles, said first rigid part being pivotably mounted about a pin that extends through said first, second and third knuckles;
    a leaf spring contained within said first rigid part, said leaf spring comprising a clamping portion for engaging a cam surface for defining stable relative angular positions of said first and second rigid parts; and
    a bush around said pin, said bush having a cylindrical passage accommodating said pin and an external peripheral surface forming said cam surface;
    said leaf spring expanding perpendicular to axes of rotation of said first and second rigid parts;
    said leaf spring is several superimposed leaf springs.

16. A door hinge comprising the hinge according to claim 15.

17. The hinge according to claim 15, further comprising a protuberance on a first end of said clamping portion, and wherein said cam surface comprises a recess for engaging said protuberance.

18. A spectacle frame comprising the hinge according to claim 15, for a spectacle frame.

19. The hinge according to claim 15, wherein said first knuckle comprises an encircling portion and said leaf spring comprises a return part, adjacent said one end of said first rigid part, shaped like a flat hook having an outward-bending open tip for elastically abutting against said second rigid part, said return part being mounted on said encircling portion.

20. The hinge according to claim 15, wherein said clamping portion is substantially in a shape of a flat hook.

* * * * *